United States Patent
Maess et al.

(10) Patent No.: US 6,833,852 B1
(45) Date of Patent: Dec. 21, 2004

(54) PRINTING METHODS WHICH ARE DEPENDENT ON ATTRIBUTES OF THE PRINTED IMAGE SUPPORT AND CORRESPONDING PRINTING DEVICES

(75) Inventors: Volkhard Maess, Erding (DE); Martin Schleusener, Zorneding (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/868,833

(22) PCT Filed: Dec. 17, 1999

(86) PCT No.: PCT/EP99/10082

§ 371 (c)(1),
(2), (4) Date: Jan. 29, 2002

(87) PCT Pub. No.: WO00/38408

PCT Pub. Date: Jun. 29, 2000

(30) Foreign Application Priority Data

Dec. 21, 1998 (DE) ......................................... 198 59 138

(51) Int. Cl.⁷ .................................................. B41J 2/36
(52) U.S. Cl. ...................................................... 347/188
(58) Field of Search ................................. 347/188, 130, 347/43, 131, 132, 135

(56) References Cited

U.S. PATENT DOCUMENTS

| | | | |
|---|---|---|---|
| 5,767,888 A | 6/1998 | Schleusener et al. | 347/130 |
| 5,774,146 A | 6/1998 | Mizutani | 347/43 |

FOREIGN PATENT DOCUMENTS

| | | |
|---|---|---|
| DE | 3431 484 A1 | 3/1985 |
| DE | 40 17 850 C1 | 6/1991 |
| EP | 0 660 589 A2 | 6/1995 |
| WO | WO 97/37285 | 10/1997 |
| WO | WO 98/46008 | 10/1998 |

*Primary Examiner*—K. Feggins
(74) *Attorney, Agent, or Firm*—Schiff Hardin LLP

(57) ABSTRACT

A method for operating a printer or copier in which at least one optical or mechanical attribute of the printed image support to be printed is detected using a sensor (steps 102, 104, 110). At least one printing parameter is given according to the sensor output signals (steps 106, 108, 112). The printed image support is then printed while using the printing parameters detected in such a manner.

3 Claims, 4 Drawing Sheets

PRINTING METHODS WHICH ARE DEPENDENT ON ATTRIBUTES OF THE PRINTED IMAGE SUPPORT AND CORRESPONDING PRINTING DEVICES

BACKGROUND OF THE INVENTION

1. Field of the Invention

The present invention is directed to printing methods wherein a print image carrier, for example paper, is printed upon employment of printing parameters that have been set and predetermined. The invention is also directed to printer devices or, respectively, copier devices for the implementation of the printing or, respectively, copying methods. The printer devices are explained in greater detail below.

2. Description of the Related Art

Printing methods that, for example, work according to the electrographic, magnetographic or some other non-mechanical principle are known. In an electrographic printing method, the printing parameters include the charge potential of the photoconductor, the auxiliary potential in the development station and other physical setting points that influence the printing process.

It is known to set the printing parameters dependent on the light sensitivity, the age or the temperature of a photoconductor employed in the printing. What is achieved by a control of the actual printing parameters is that the predetermined rated printing parameters to be set are also adhered to given disturbances, for example given fluctuating ambient em or altered atmospheric humidity, with the result that the printing conditions remain the same. It has been shown, however, that print images of the same high print quality are not always produced even given identical printing conditions.

Japanese published application JP-08-058081 A discloses an ink jet printer wherein the moisture content of the print image carrier is acquired. The amount of ink employed for printing is set dependent on the acquired moisture content in order to avoid a "bleeding" of the print image.

Japanese Published Application JP-06-115061 A discloses an ink jet printer wherein the amount of ink employed in printing is to be set dependent on the absorbency of the paper, on the permeability or on the surface temperature. A sensor electronically acquires the thickness of the fully saturated paper. Heating resistors that serve for the ejection of ink droplets are driven dependent on the acquired thickness.

German Published Application DE 34 31 484 A1 explained a color ink jet printer wherein, using an optical sensor, a distinction is made between normal paper and a transparent film to be printed. Dependent on the acquired print image carrier, fewer printing points per picture element to be presented are generated in a first operating mode for normal paper than when printing film.

German Letters Patent DE 40 17 850 C1 is directed to a method and an apparatus for regulating the radiation dose of laser radiation when processing materials.

European Patent Document EP-A-0660589 discloses a method for operating a printer, or copier. An input unit is provided in a first exemplary embodiment into which the type of recording medium, for example normal paper, bond paper OHP sheets (overhead paper), smooth paper or recycling paper, is manually input. This input is automated in further exemplary embodiments in that an optical sensor acquires the transmission, the surface condition or the thickness of the recording medium and automatically determines the type of recording medium dependent on the identified values. An optimization of the printing event is then undertaken dependent on the identified type of recording medium in that the illumination level is modified. Further, an adaptation can ensue in view of the hue and the color saturation.

Patent Abstracts of Japan, vol. 1995, no. 09, 31 October 1995 & JP 07 162695 A (Canon, Inc.), 23 Jun. 1995, discloses a color image processor with whose assistance an optimum color balance can be achieved by measuring spectroscopic properties of a recording material. A sensor acquires the light that passes through a recording paper. An RGB sensor measures the color parts of an image of an original master. A computer carries out an RGB correction.

U.S. Pat. No. 5,774,146 discloses an ink printing method with colored ink in order to print a multi-color image. A sensor acquires surface parameters, for example coefficients of friction, the surface roughness, the light reflection of the print paper or a combination thereof. The type of paper employed is then identified on the basis of the sensor signals and printing parameters are defined.

SUMMARY OF THE INVENTION

An object of the present invention is to provide printing or, respectively, copying methods wherein the quality of the print images is improved further. Another object of the invention is to provide printer devices that print printed images with high printing quality.

This and other objects of the invention are provided by a method for operating a printer or copier device, whereby at least one optical property of the print image carrier to be printed with a print image is acquired with a sensor, at least one printing parameter is set dependent on the sensor output signal of the sensor, and whereby the print image carrier is printed in a printing event upon employment of the print parameter that has been set step, characterized in that, given a black-and-white printing with gray levels, the gray scale value of the print image carrier is acquired with the assistance of a brightness sensor; and in that at least one printing parameter that influences the generation of the gray levels is set dependent on the output signal of the gray scale value sensor; in that a multi-level character generator is employed when exposing a photoconductor in an electrographic printer or copier device; and in that the illumination energies of the character generator allocated to specific light-coding values are set dependent on the sensor output signal, whereby gray transformation relationships that indicate the illumination energies allocated to the light-coding values dependent on the gray scale value are preferably employed, the gray transformation relationships belonging to specific sensor output signals.

The invention also provides a method for operating a printer or copier device, whereby at least one optical property of the print image carrier to be printed with a print image is acquired with a sensor, at least one printing parameter is set dependent on the sensor output signal of the sensor, and whereby the print image carrier is printed in a printing event upon employment of the print parameter that has been set, characterized in that, given color printing, the color locus of the print image carrier is acquired with the assistance of a color sensor; in that the rated color densities of the colors to be printed are determined with predetermined color transformation relationships that allocate rated color densities for the color separations employed in the printing to the acquired color loci; in that the transformation relationships are empirically determined before the printing event, and are stored as analytical equations or as table in a memory of the printer or, a respectively, copier device.

Further, the invention provides a method for operating a printer or copier device, whereby at least one mechanical property of the print image carrier to be printed with a print image is acquired with a sensor, at least one printing parameter is set dependent on the sensor output signal of the sensor, and whereby the print image carrier is printed in a printing event upon employment of the print parameter that has been set, characterized in that, the roughness of the surface of the print image carrier is acquired with a roughness sensor; in that the toner quantity to be applied onto the print image carrier is set dependent on the output signal of the roughness sensor, whereby the charge potential of a photoconductor collaborating in the printing event and the auxiliary potential of an allocated development station are simultaneously modified. The printing parameters may be modified such that the size of the picture elements of the print image on the print image carrier remains approximately the same.

An additional aspect of the invention provides a method for operating a printer or copier device, whereby at least one optical property of the print image carrier to be printed with a print image is acquired with a sensor, at least one printing parameter is set dependent on the sensor output signal of the sensor, and whereby the print image carrier is printed in a printing event upon employment of the print parameter that has been set, characterized in that the light scatter of the surface of the print image carrier is acquired with an optical sensor; in that printing parameters that determine the raster tonal value or, respectively, the gray scale value and/or the dimensions of fine print details are prescribed dependent on the acquired light scatter; in that a raster toner mark is printed onto the print image carrier; and in that light reflected and/or scattered back in the region of the raster toner mark is acquired with the optical sensor. This aspect is further characterized in that the raster toner mark is applied upon employment of printing parameters that had been previously defined dependent on the gray scale value or color locus of the print image carrier.

In a preferred embodiment, the method is implemented in an electrophotographic printer. Specifically, the illumination energy of an illumination device for exposing a light-sensitive element, an auxiliary potential in a developer unit for the application of toner particles and/or the charge potential of the light-sensitive element are employed as printing parameters. In the method for operating a printer or copier device, the foregoing methods may be utilized in combination.

The invention also provides a printer or copier device, particularly for the implementation of the method, having a printer unit for printing a print image carrier according to predetermined printing parameters, a sensor unit for acquiring at least one optical or mechanical property of the print image carrier to be printed, and a control unit that sets at least one printing parameter dependent on the output signal of the sensor unit, when printing with gray levels, the gray scale value of the print image carrier is acquired with the assistance of a brightness sensor and at least one printing parameter that influences the generation of the gray levels is set dependent on the output signal of the gray scale value sensor given color printing, the color locus of the print image carrier is acquired with the assistance of a color sensor and the rated color densities of the colors to be printed are determined with predetermined color transformation relationships that allocate rated color densities for the color separations employed in the printing to the acquired color loci, and/or in that the roughness of the surface of the print image carrier is acquired with a roughness sensor and the toner quantity to be applied onto the print image carrier is set dependent on the output signal of the roughness sensor; whereby the printing parameters are modified such that the size of the picture elements of the print image on the print image carrier remains approximately the same; and/or the light scatter of the surface of the print image carrier is acquired with an optical sensor; a raster toner mark is preferably printed onto the print image carrier; light reflected or allowed to pass by the raster toner mark is acquired with the optical sensor; and printing parameters that determine the raster tonal value or, respectively, the gray scale value and/or the dimensions of fine print details are prescribed dependent on the acquired light scatter.

The inventive methods are based on the perception that the properties of the print image carrier to be printed critically influence the printing. Print images with constantly high print quality and with constant printed image impression for the viewer on print image carriers having different properties can only be generated when the influences of these properties on the print image are taken into consideration in the printing event. In the inventive method, at least one optical or mechanical property of the print image carrier to be printed is therefore acquired with the assistance of a sensor. At least one printing parameter is then set dependent on the sensor output signal. What this measure achieves is that influences of the type of paper employed, for example yellowish, rough environmental paper instead of white, smooth paper, on the print quality and, thus, on the subjective impression made on the viewer of the print image are taken into consideration and compensated.

In the method according to the present invention, the gray scale value of the print image carrier is acquired with a brightness sensor when printing with gray levels. Moreover, at least one printing parameter that influences the generation of the gray levels is set dependent on the output signal of the gray scale value sensor. For example, the number of gray scale values that is presented given what is referred to as a multi-level character generator, as disclosed by U.S. Pat. No. 5,767,888, is also retained unmodified given print image carriers having a different gray scale value in that the illumination energies allocated to specific light-coding values are set dependent on the output of the brightness sensor. Gray transformation relationships belonging to specific output signals of the brightness sensor are thereby preferably employed, the relationships indicating the illumination energies allocated to the light-coding values being dependent on the gray scale value. What is achieved by modifying the illumination energies is that, independently of the gray scale value of the print image carrier, the same number of gray levels remain distinguishable in the print image because a variation of the gray scale values in the print image is opposed by the gray scale value of the print image carrier. What can be particularly prevented is that a saturation appears given dark gray scale values that makes regions with these gray scale values appear black. The dark gray tones thus remain distinguishable both mensurationally as well as when viewed.

In the method according to a further aspect of the invention, the color locus of the print image carrier is acquired with the assistance of a color sensor given color printing. Subsequently, the rated color densities of the colors to be printed are determined with predetermined color transformation relationships that allocate rated color densities to the acquired color locuss, these assuring that colors that correspond to the colors to be produced on white normal paper are generated in the print image despite the color locus that deviates from white. Full-color images printed on a colored paper thus have the same number of colors that would arise on white paper without the correction. For example, the color densities of the four color separations yellow, magenta, cyan and black are corrected. Similar to the gray scale value, differences in the color locus of the print image carrier lead to a modified number of presented color levels when a saturation given dark colors is not opposed. The differences in the color locus of the print image carrier also influence the hue of the print image when the color transformation relationships are not suitably selected.

In one development, the gray and color transformation relationships are empirically determined before the printing event and are stored in a memory of the printer or, respectively, copier, preferably as analytical equations or as a table. In the empirical determination of the transformation relationships, the corrections of the gray levels or, respectively, of the color separations are evaluated, this being undertaken by an experienced printing technician dependent on the brightness or, respectively, on the color of the paper.

As a critical property of the print image carrier, the roughness of the print image carrier is acquired with the assistance of a roughness sensor given the method according to another aspect of the invention. The amount of toner to be applied onto the print image carrier is influenced dependent on the output signal of the roughness sensor in that, for example given an electrophotographic printing event, the charge potential of the photoconductor and/or the auxiliary potential at the development station is raised or, respectively, lowered. What this measure achieves is that more or fewer toner particles are deposited without modifying the boundaries of the pixels (picture elements). When, for example, the gray tones are generated with the assistance of a rastering step, then fades at the edge of the raster area given rough paper are prevented with a more intense application of toner. The gray scale value, defined as a ratio of covered and non-covered area, remains constant independently of the roughness of the print image carrier.

As a further property of the print image carrier, the light scatter of the print image carrier is acquired with an optical sensor in another development given the method according to yet a further aspect of the invention. Light scatter and gray scale value are different properties of the print image carrier. When, for example, the printer device works with a raster in order to present different gray tones, then the light scatter of the print image carrier is acquired, for example, in that a raster toner mark at which toner-free and toner-covered regions alternate, for example in the fashion of a checkerboard pattern, is printed on the print image carrier. After the raster toner mark is fixed in a fixing station, the raster toner mark is irradiated with light having a predetermined intensity and the light remitted by the raster toner mark is acquired with the optical sensor. The optical sensor covers a region that averages over the light and dark areas of the raster toner mark. The region is selected of such a size that statistical fluctuations in the print image of the raster toner mark do not falsify the result of the acquisition. Printing parameters that determine the raster tone value or, respectively, the gray scale value and/or the dimensioning of fine print structures, for example fine lines, are then set dependent on the acquired light quantity. Given an electrophotographic printing event, for example, the charge potential of the photoconductor is varied given a constant auxiliary potential at the development station. For example, the raster in the raster toner mark has a rastering of 42 $\mu$m. When the raster toner mark has a size of approximately 1 $cm^2$, then the light scatter of the print image carrier can be acquired in a simple way because more or less light proceeds under the covered toner regions of the raster and is absorbed thereat dependent on the dispersion properties of the print image carrier.

By acquiring the light quantity with the assistance of a raster toner mark, the gray scale value produced by the print image carrier and by the toner image is also acquired. Since the gray scale value or, respectively, the raster toner value are also dependent on the gray scale value or, respectively, the color value of the surface of the paper, these properties of the carrier material can also be indirectly taken into consideration when the printing parameters are set dependent on the raster toner value determined with the raster mark.

In a development, the raster toner mark is applied upon employment of printing parameters that have been previously defined dependent on the gray location or, respectively, color locus of the print image carrier and/or dependent on the roughness of the print image carrier. In this procedure, the properties having the greatest influence on the print image and, thus, on the impression of a viewer are taken into consideration first. Subsequently, the light scatter—which does not have a negligible influence on the print image—is taken into consideration.

The invention is also directed to printer or, respectively, copier devices that, in particular, can be employed for the implementation of the inventive methods or their developments. The aforementioned technical effects also apply to the printer or, respectively, copier devices.

BRIEF DESCRIPTION OF THE DRAWINGS

Exemplary embodiments of the invention are explained below on the basis of the attached drawings.

DETAILED DESCRIPTION OF THE PREFERRED EMBODIMENTS

Figure 1:
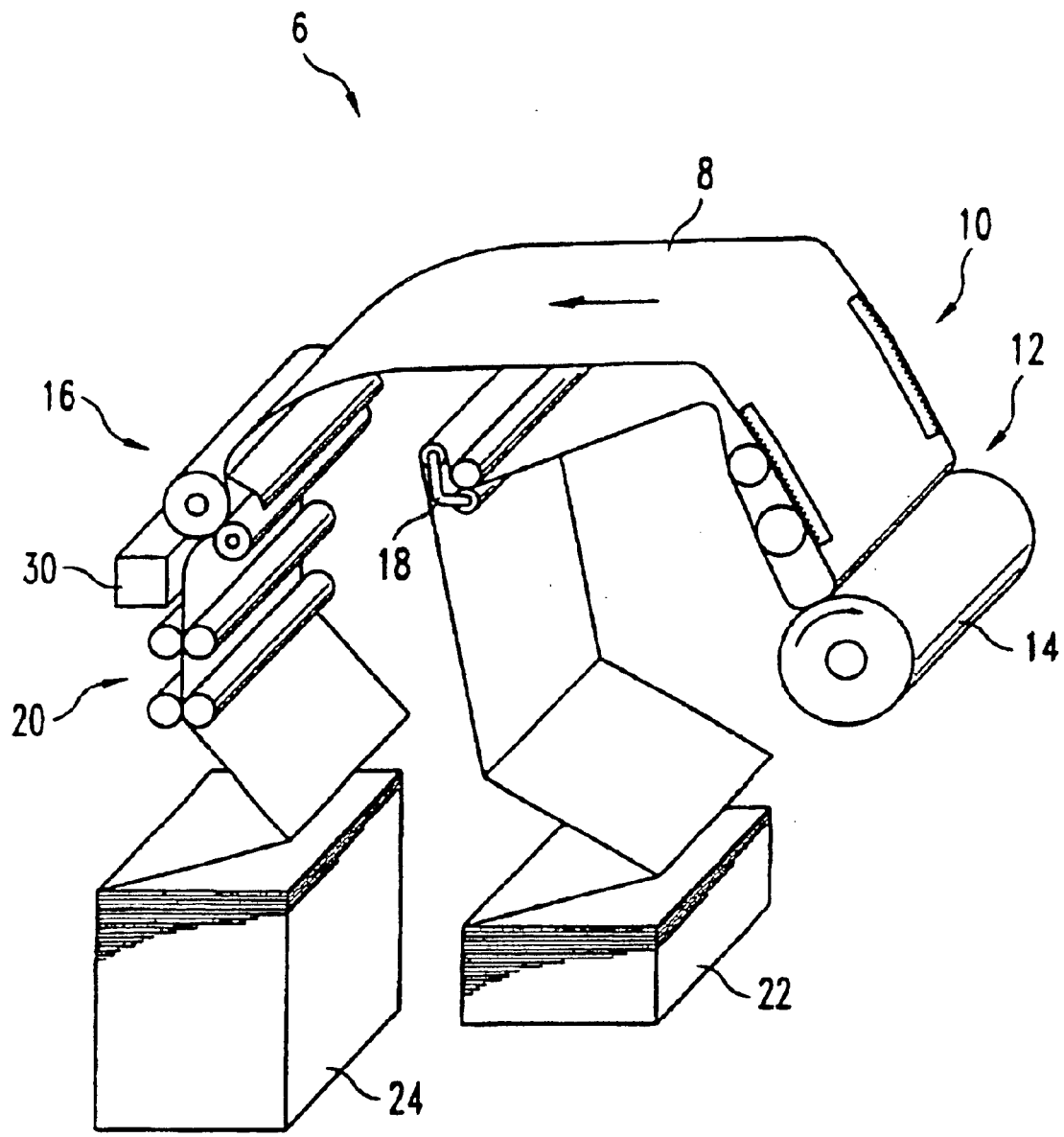
FIG. 1 is a schematic illustration of a printer device in perspective view.

FIG. 1 shows a schematic illustration of a high-performance printer device 6. The printer device 6 has a transport mechanism 10 that is arranged close to a transfer printing station 12 and conveys form continuous carrier material through the transfer printing station 12, wherein the charge image applied on a photoconductor drum 14 and inked with toner is transferred onto the carrier material with a corona device (not shown). Subsequently, the continuous form carrier material is supplied to a fixing station 16 wherein the toner image, which can still be smeared, is joined smear-proof to the carrier material with the assistance of pressure and temperature. As viewed in the transport direction indicated by an arrow, a first deflection unit 18 that conducts the continuous form carrier material to the transfer printing station and can turn the continuous form carrier material over or merely offset it laterally dependent on the selected printing mode is arranged preceding the transfer printing station 12. A second deflection unit 20 is arranged after the fixing station 16 as viewed in the transport direction. The second deflection unit 20 stacks the printed continuous form carrier material and, likewise dependent on the selected printing mode, can also deliver the material to the first deflection unit 18.

FIG. 1 shows the printer 6 in a first printing mode, the simplex mode, wherein a web section 8 of the continuous form carrier material from a stack 22 is supplied to the printing unit 12 by the first deflection unit 18. After the printing step, the transport mechanism 10 transports the web section 8 in the direction of the fixing station wherein the toner image is permanently bonded to the continuous form carrier material. Subsequently, the second deflection unit 20 stacks the web section 8 on a second stack 24.

The printer device 6 also contains a sensor unit 30 that is arranged between the fixing station and the deflection unit 20. The sensor unit 30 contains a plurality of sensors for acquiring the properties of the continuous form carrier material, i.e. of the continuous form paper. The individual sensors are explained below in conjunction with FIGS. 2 and 3.

Figure 2:
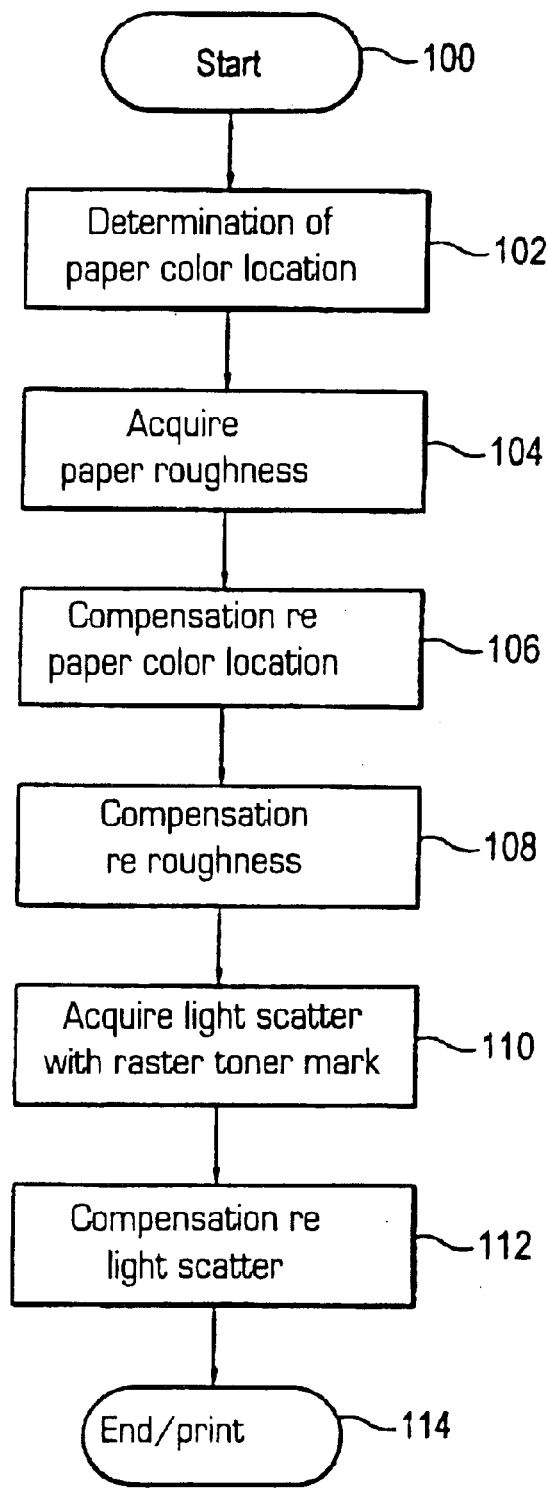
FIG. 2 is a flowchart for a paper-dependent color printing method.

FIG. 2 shows a flowchart for a color printing method dependent on properties of the paper, this beginning in step 100 after the paper has been changed. In a following step 102, the color locus of the paper is acquired with a color sensor. This ensues with one of the device of the X-Rite company of Grandville, Mich., USA, as described in their brochures "The Colour Guide and Glossary" (1996) and "A guide to understanding Colour Communication" (1993). The color locus is defined according to the color standard CIE 1976 (L*a*b*) recommended by the CIE (Commission International de l'Eclairage) and mentioned in the brochures, which is also referred to as CIELAB.

In the following method step 104, the roughness of the paper to be printed is acquired with a commercially available roughness sensor, for example a paper roughness sensor according to Bendtsen. In this method, the roughness is identified in that air is suctioned in with a hollow sensor placed on the paper that comprises air entry holes on that surface placed on the paper. The quantity of air sucked in in ml/min is then a measure for the roughness of the paper.

Subsequently, a compensation with respect to the paper color locus is implemented in a method step 106 when the paper color locus determined in method step 102 deviates from a predetermined reference color locus. In the printing method explained with reference to FIG. 2, the color separations yellow, magenta, cyan and black are employed in an electrophotographic printer. In step 106, a color transformation curve is selected for the paper color locus of the paper to be printed, correction factors for correcting reference color densities for the four color separations being determined with the color transformation curve. The corrected color densities are stored for the printing event as rated values for a color separation density control.

In a following method step 108, the influence of the roughness of the paper is compensated when the roughness identified in the method step 104 deviates from a reference roughness. The roughness of smooth paper is employed as a reference roughness, i.e. paper having a roughness value according to Bendtsen of less than 100 ml/min. Given a smooth paper surface, less toner per surface area is required for a specific inking than given rough paper. For compensating the roughness in method step 108, the charge potential of the photoconductor and the auxiliary potential in the developing station are therefore simultaneously modified. What is achieved with this measure is that more toner material is deposited per pixel area but the respective character or raster contour is not modified. The charge potential of the photoconductor and the auxiliary potential VBias determined in method step 108 are stored in a memory of the printer device 6.

The light scatter of the paper to be printed is acquired in a method step 110. To that end, a raster toner mark is printed on the paper, whereby the printing parameters identified in method steps 106 and 108 are employed. The raster toner mark is preferably irradiated with a light source after the fixing step in a fixing station. The light reflected by the raster toner mark is acquired with a light sensor that works in an integrating fashion. Given employment of a reference paper, a reference value DZ of the light scatter is acquired. Given a paper whose light scattering properties deviate from those of the reference paper, a light scatter value D deviating from the reference value DZ is acquired given what is otherwise the same toner distribution on the paper.

In a method step 112, the influence of the light scatter of the paper on the print image is compensated when the light dispersion value D acquired in method step 110 deviates from the reference value DZ. The compensation ensues in that the charge potential VC of the photoconductor is modified given an unmodified auxiliary potential VBias. What are thus varied are printing parameters that determine the raster tonal value of the images and the dimensions of fine printed structure such as, for example, the line width. A print image arises on the respectively employed paper that corresponds to a print image printed on the reference paper under standard conditions. When the light dispersion value is lower than the reference value DZ, then the printing parameters are varied such that the raster tonal value and the detail dimensions are increased. For example, the charge potential VC is lowered given an unmodified auxiliary potential VBias.

In a method step 114, the method for determining the printing parameters that are dependent on the paper is ended. The printing parameters that have been identified are then retained in the following printing events.

Figure 3:
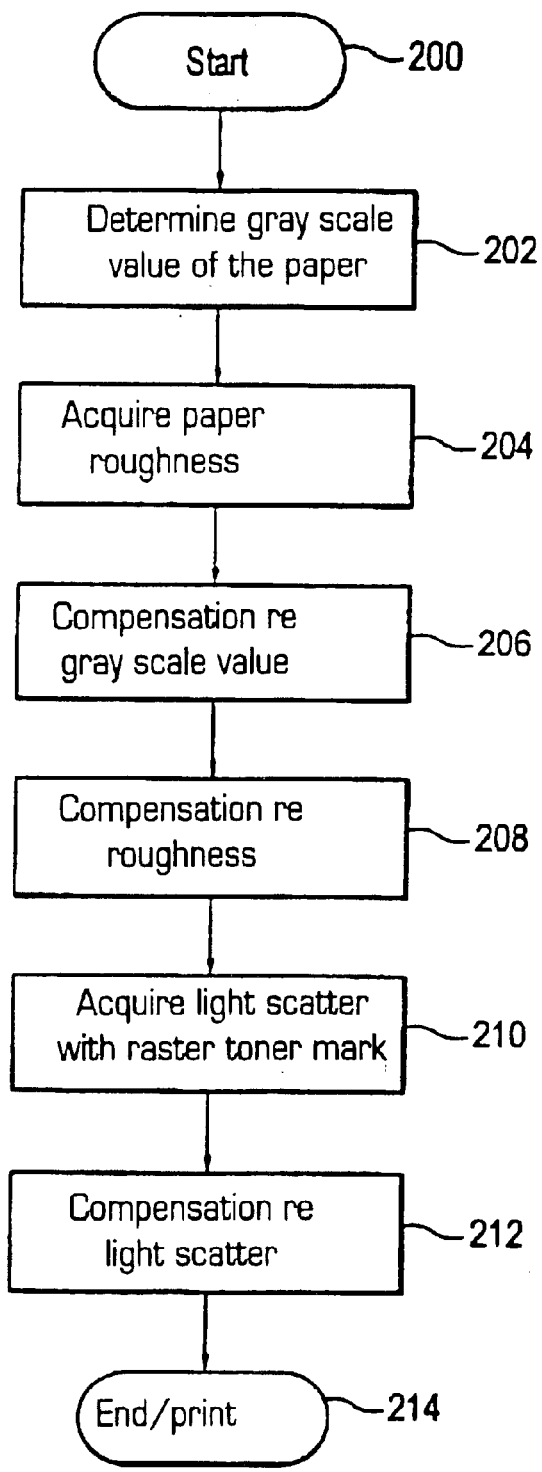
FIG. 3 is a flowchart for a color-dependent black-and-white printing method.

FIG. 3 shows a flowchart for a paper-dependent black-and-white printing method. The method begins in a step 200.

In a method step 202, the gray scale value of the paper to be printed is acquired with a brightness sensor. Simultaneously or subsequently, the paper roughness is acquired in a method step 204, as already explained above for the method step 104. Subsequently, the influence of the gray scale value of the paper on the print image is compensated in a method step 206. It is thereby taken into consideration that, given non-white paper, the gray scale values in the print image are shifted overall to higher values compared to the same gray scale values on white paper. The black-and-white print image printed on non-white paper is matched to a print image printed on white paper in that parameters of the printing process are modified such that the same number of gray levels remains distinguishable. In the exemplary embodiment, a multi-level character generator that, for example, is disclosed by U.S. Pat. No. 5,767,888 is employed for the printing. The overall process characteristic of the printing process is deformed in that the light-coding values of the multi-level character generator have corrected illumination energies allocated to them. This ensues either individually for each light-coding value or for all light-coding values in the same relationship. The corrected illumination energies are stored for the further printing processes.

In a method step 208, the influence of the roughness of the paper is taken into consideration such as explained above for the method step 108. In method step 210, the light scatter of the paper is acquired upon employment of a raster toner mark that is printed onto the paper with the printing parameters determined in method steps 206 and 208. The compensation of the influence of the light scatter of the paper on the print image ensues in method step 212 as explained above for the method step 112. The method is ended in the method step 214.

In other exemplary embodiments, which are not shown, the methods explained on the basis of FIGS. 2 and 3 are also implemented after the printer device 6 is turned on. As a result of this measure, the properties of paper that has been placed therein with the printed device 6 turned off can also be taken into consideration.

In all methods being set forth, the employment of an additional sheet is avoided with the light scatter as determined without a raster toner mark. The explained methods are then implemented before the first sheet of paper is printed. The printing parameters that are thereby determined are then already employed when the print image is applied onto the first sheet.

Given the methods explained on the basis of FIGS. 1 through 3, surface properties of the print image carrier to be printed are acquired. Sensors and receivers are preferably located at one side of the print image carrier to be printed. Thus, the sensor unit 30 shown in FIG. 1 is arranged lying opposite that print side of the web section to be printed. Thus, either mechanical or optical surface properties of the print image carrier are acquired. The optical properties are closely related to the light remission, i.e. to the light cast back from the surface. The light remission is essentially defined by the reflected radiation, the radiation scattered back at the print image carrier and the color composition of the remitted light.

Figure 4:
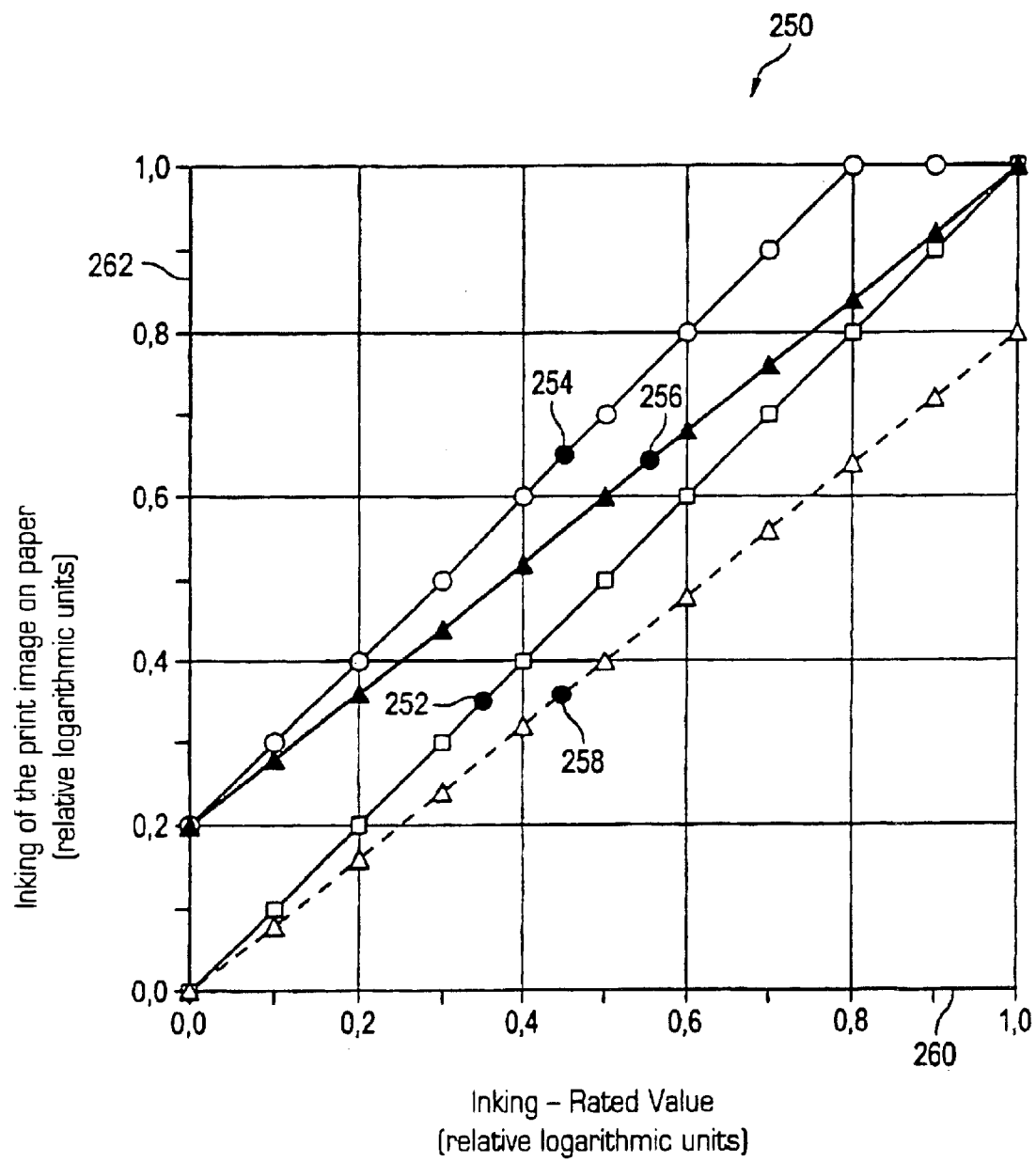
FIG. 4 is a diagram for illustrating various process characteristics.

FIG. 4 shows a diagram 250 related to the presentation of various process characteristics 252 through 258. The rated values for the inking are entered on the x-axis 260. The actual values for the inking of the print image printed on the print image carrier, for example the paper, are shown on the y-axis. The numerical values shown on the x-axis 260 or, respectively, on the y-axis 262 are without units since they are a matter of relative logarithmic units. Given the employment of paper with a rated white with which all colors would be reflected at 100%, an optimally set printing process leads to the process characteristic 252. The process characteristic 252 begins in the zero point of the diagram 250 shown in FIG. 4 and ends in the intersection of the x-value 1.0 and the y-value 1.0. The process characteristic 252 is linear between the start and end point.

When paper that has a gray scale value or, respectively, a color that deviates from the rated white is employed, then unprinted regions already have the inking 0.2. The inking corresponds to a specific gray scale value. Moreover, the process characteristic 252 is shifted toward higher inkings of the paper, illustrated by the process characteristic 254. The other paper properties such as roughness and light scatter behavior also influence the gray scale value arising on the paper. Given the process characteristic 252, all image regions appear with rated gray scale values above 0.8 black. A saturation occurs in this region and gray scale values cannot be distinguished from one another in this region. For a best possible image reproduction, all gray scale values to be reproduced in the image must be uniformly distributed over the available range from 0.2 through 1.0. A process characteristic as illustrated by the process characteristic 256 in FIG. 4 is required therefor. A printing process set according to the process characteristic 256 yields the process characteristic 258 when printed on paper with rated white, this being shifted such relative to the process characteristic 256 that it begins in the origin of the diagram 250 and ends in the intersection of the x-value 1.0 and of the y-value 0.8. When the same toner image is printed on paper that deviates from the rated white, then, for example given black-and-white printing, the gray scale values of paper and toner image superimpose. The process characteristic 258 arise due to the superimposition.

In one exemplary embodiment, correction values for specific process parameters of the printing process are determined such that a plurality of gray scale raster marks are printed on the paper to be employed, being initially printed in a first part of the method with a predetermined printing process, for example with the printing process for paper having the color rated white. Subsequently, the raster mark gray scale values achieved on the paper as well as the gray scale value of the unprinted paper are acquired with a brightness sensor. The correction values for the printing process parameters can be determined with the assistance of the acquired values, this being shown in FIG. 4 by circles on the process characteristic 254. Subsequently, the corrected parameters are stored for the further printing method in a control unit of the printer, of the printer device 6.

Some possibilities for influencing the electrophotographic printing process are indicated in the following patent documents:

German Patent Document DE 198 59 140, printer devices working with at least three brightness levels as well as methods to be implemented therewith for determining printing parameters, particularly the relationships shown in FIG. 6 of this patent document;

German Patent Document DE 198 59 094, method for printing with a multi-level character generator as well as a printer device, as example of the determination of correction factors with which a predetermined characteristic can be achieved;

German Patent Document DE 198 59 93, method for improved the electrographic printing of image details as well as a printer device working according to this method, as an example of the correction of the charge of the photoconductor as a result of modified illumination energies; and German Patent Document DE 196 12 637, method for optimizing the generation of a charge image.

The possibilities indicated in the references for influencing the printing process are also recited in the subsequent applications based on these applications.

The determination of the correction values is implemented in a plurality of matching steps in order to better approach the target characteristic, see, for example, the process characteristic 258. The plurality of gray scale raster marks is selected such that an adequate approach to the target characteristic can be achieved with a reasonable acquisition and calculating outlay. Gray scale values that have not been acquired can be determined by interpolations. In the simplest case, a process matching can also ensue without a test printing of raster gray scale values and without acquisition of the gray scale value of these raster marks. To that end, only the gray scale value of the unprinted paper is measured with the brightness sensor. The process parameter corrections are then determined from this measured value.

The matching for the color printing ensues similar to that given black-and-white printing. Thus, the sub-processes of the color separations needed for the color printing are successively adapted to the paper properties, i.e., for example, for color separations of the colors yellow, magenta, cyan and black. Instead of the brightness sensor for measuring the gray scale values of the raster marks and of the unprinted paper, a color sensor is employed in color printing for measuring the inking values of the raster marks and of the paper, see, for example, the aforementioned color sensors of the X-Rite company.

The matching process in the color printing can be simplified in that, particularly given not especially high quality demands, the matching is eliminated from one or more sub-processes. For example, only the color separation for black and one further color is adapted when only what is referred to as a highlight color printing is to be implemented.

Although other modifications and changes may be suggested by those skilled in the art, it is the intention of the inventor to embody within the patent warranted hereon all changes and modifications as reasonably and properly come within the scope of their contribution to the art.

What is claimed is:

1. A method for operating a printer or copier device, comprising the steps of:

acquiring at least one optical property of the print image carrier to be printed with a print image with a sensor;

setting at least one printing parameter dependent on an output signal of the sensor;

printing the print image carrier in a printing event utilizing the at least one print parameter that has been set;

acquiring light scatter of a surface of the print image carrier with an optical sensor;

prescribing printing parameters that determine one of a raster tonal value and a gray scale value and dimensions of fine print details dependent on the acquired light scatter;

printing a raster toner mark onto the print image carrier; and acquiring light that is one of reflected and scattered back in a region of the raster toner mark with the optical sensor.

2. A method as claimed in claim 1, wherein the raster toner mark is applied utilizing the at least one printing parameter that has been previously defined dependent on one of a gray scale value and a color locus of the print image carrier.

3. A printer or copier device, comprising:

a printer unit for printing a print image carrier according to predetermined printing parameters;

a sensor unit for acquiring at least one optical or mechanical property of the print image carrier to be printed;

a control unit that sets at least one printing parameter dependent on an output signal of the sensor unit;

given gray scale printing, a brightness sensor which acquires a gray scale value of the print image carrier so that at least one printing parameter that influences generation of the gray levels is set dependent on an output signal of the brightness sensor;

given color printing, a color sensor which acquires a color locus of the print image carrier to that rated color densities of colors to be printed are determined with predetermined color transformation relationships that allocate rated color densities for color separations employed in the printing to the acquired color loci;

a roughness sensor to sense roughness of a surface of the print image carrier so that toner quantity to be applied onto the print image carrier is set dependent on an output signal of the roughness sensor;

a control to modify printing parameters such that size of picture elements of the print image on the print image carrier remains approximately the same;

an optical sensor to sense light scatter of the surface of the print image carrier;

a raster toner mark is printed onto the print image carrier so that light reflected the raster toner mark is acquired with the optical sensor;

printing parameters that determine at least one of raster tonal value and gray scale value and dimensions of fine print details being prescribed dependent on acquired light scatter.

* * * * *